April 21, 1925.

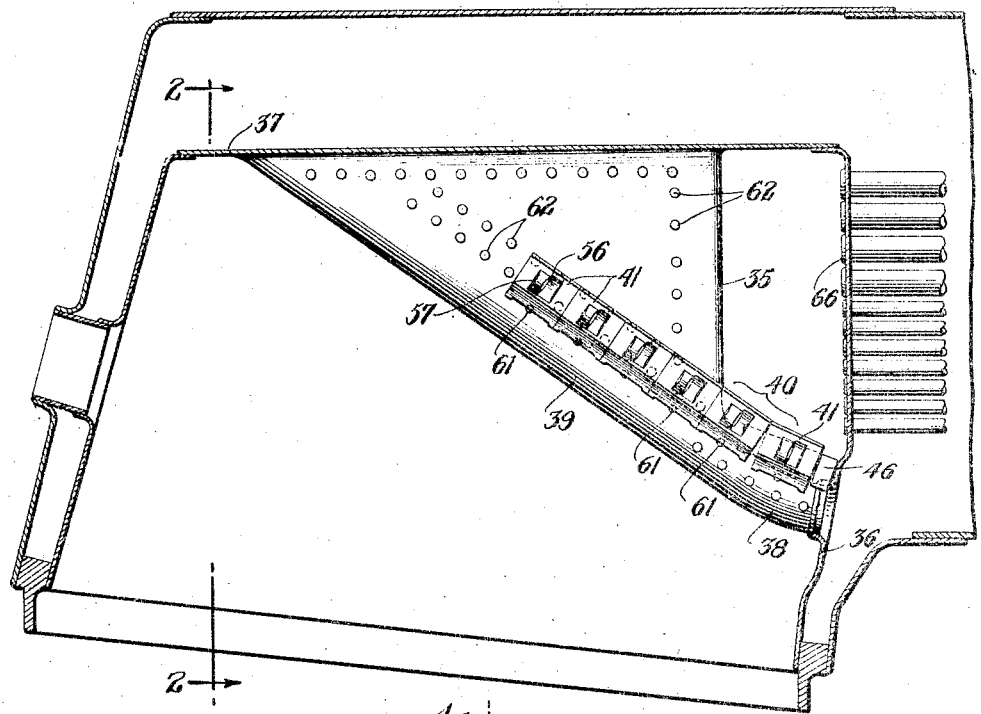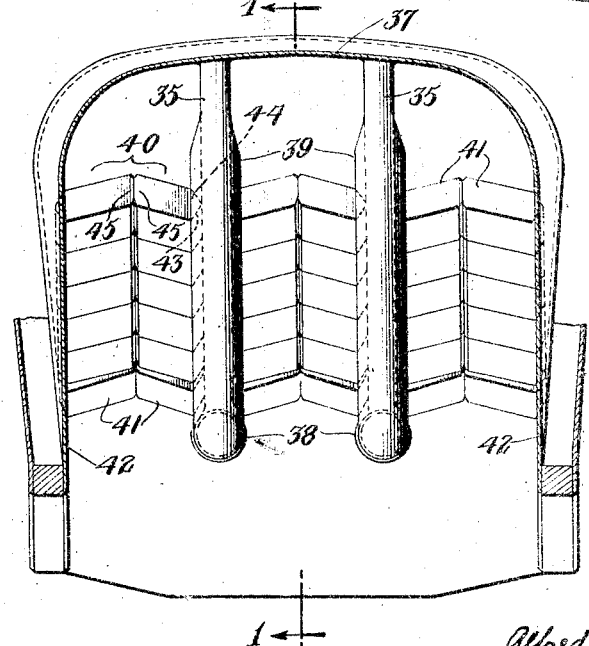

A. H. WILLETT ET AL

FIRE BRICK

Filed Feb. 17, 1922

WITNESS

Inventors
Alfred H. Willett and
Harry S. Martin
By their Attorneys

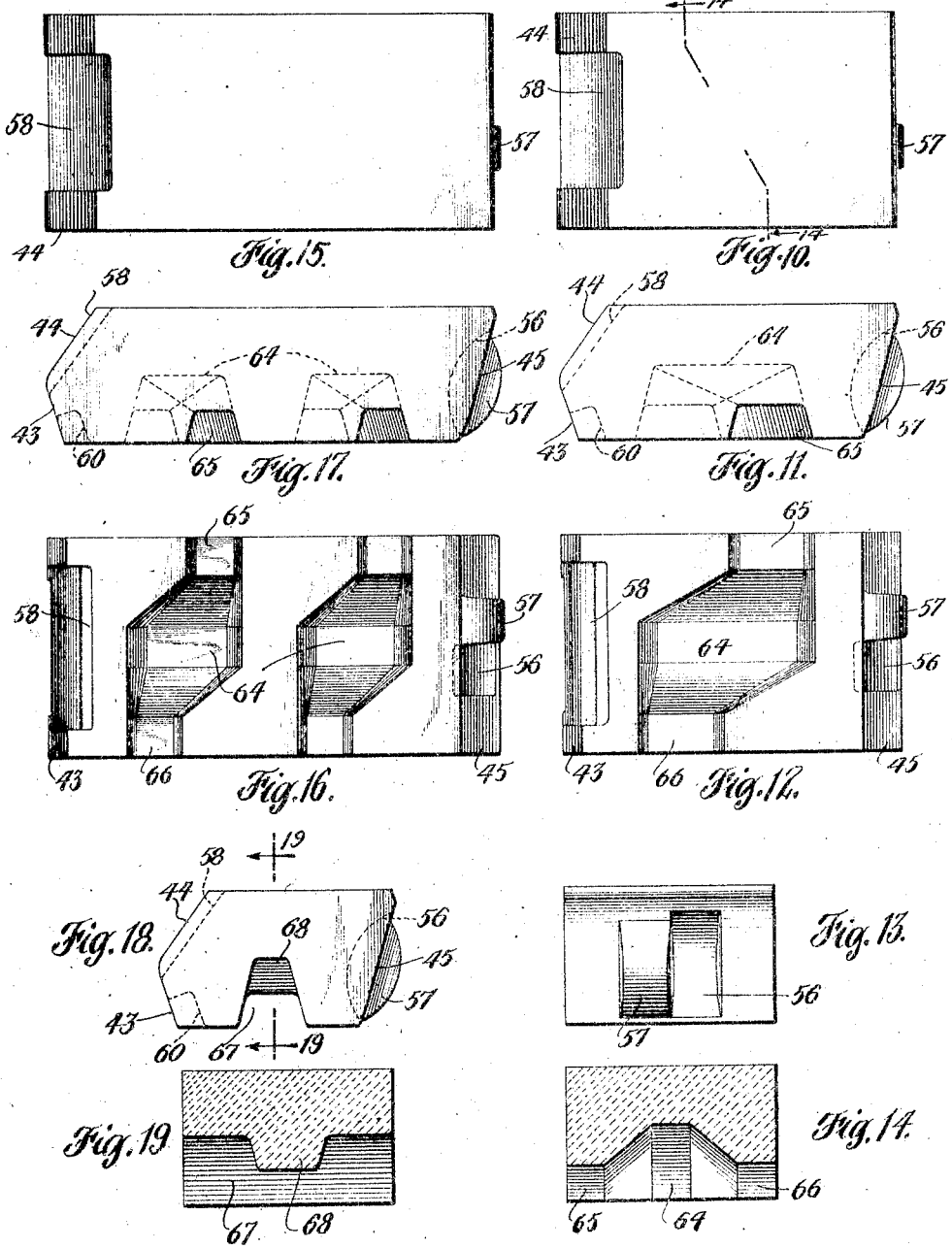

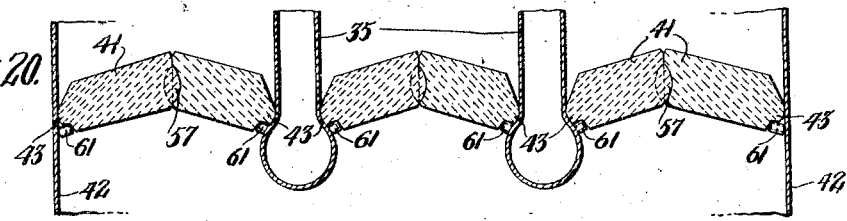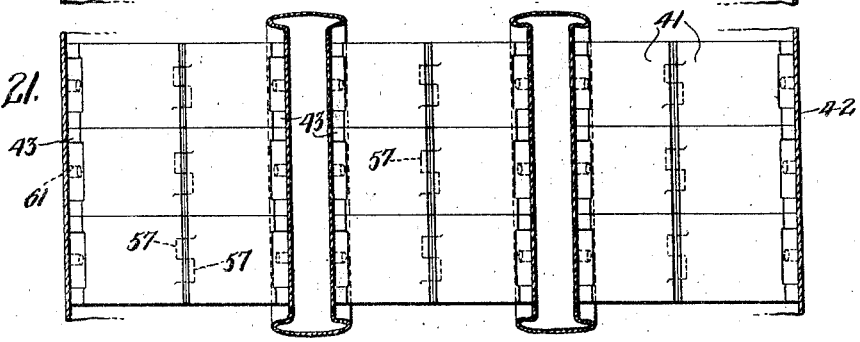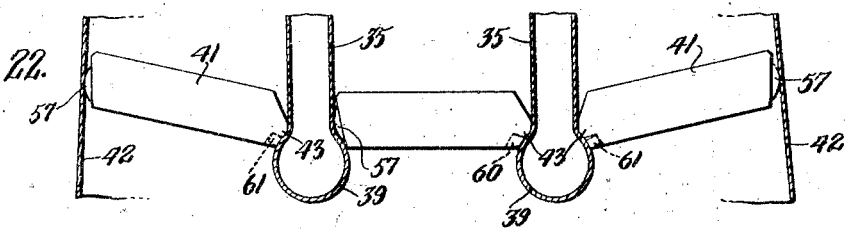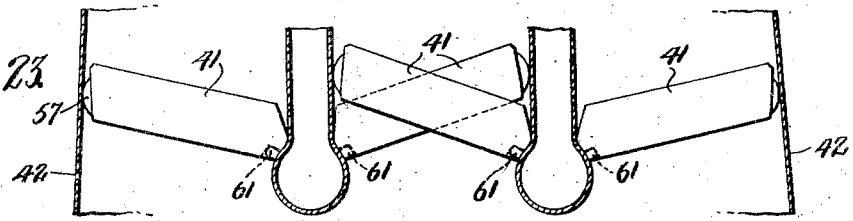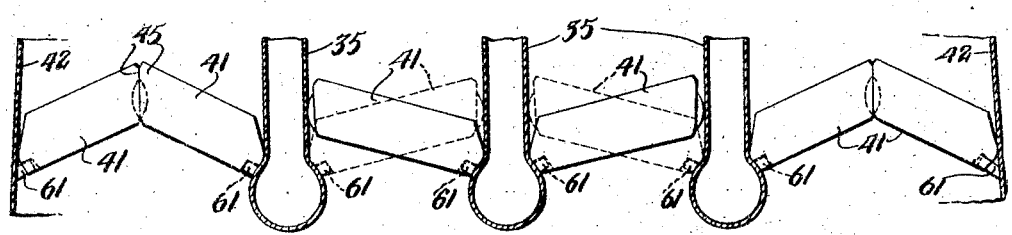

April 21, 1925. 1,534,475
A. H. WILLETT ET AL
FIRE BRICK
Filed Feb. 17, 1922 7 Sheets-Sheet 6

Inventors
Alfred H. Willett and
Harry S. Martin
By their Attorneys
Synnestvedt & Lechner

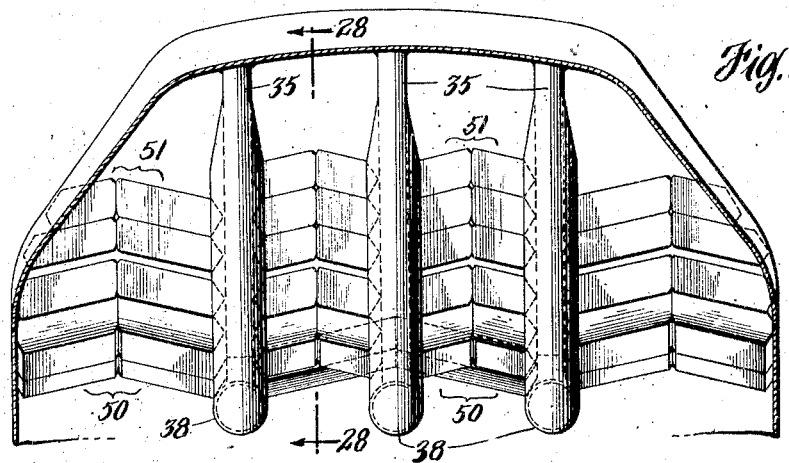
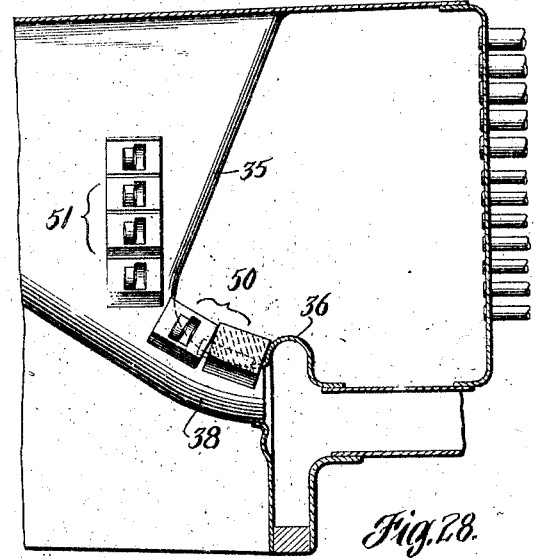
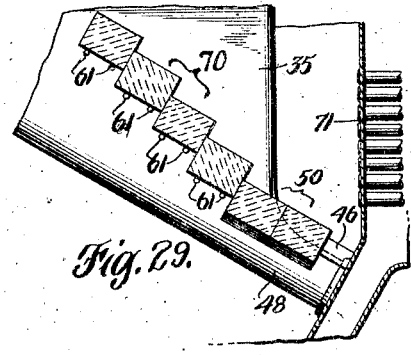
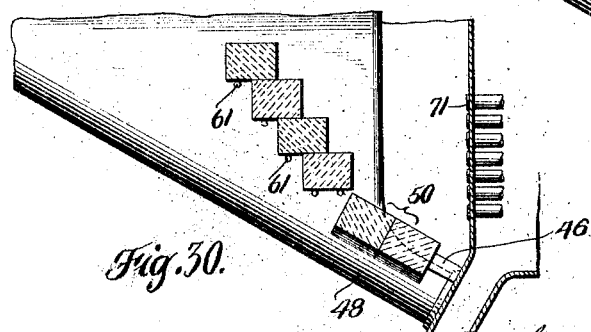
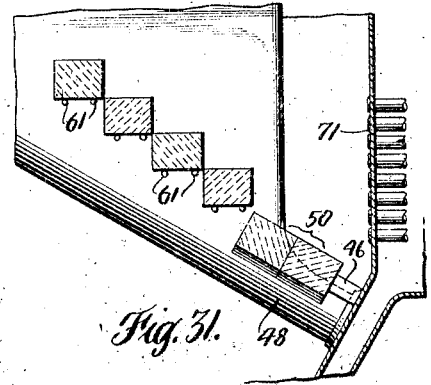

Patented Apr. 21, 1925.

1,534,475

UNITED STATES PATENT OFFICE.

ALFRED H. WILLETT, OF WEST NEW YORK, AND HARRY S. MARTIN, OF RIDGEWOOD, NEW JERSEY, ASSIGNORS TO AMERICAN ARCH COMPANY, A CORPORATION OF DELAWARE.

FIRE BRICK.

Application filed February 17, 1922. Serial No. 537,182.

*To all whom it may concern:*

Be it known that we, ALFRED H. WILLETT and HARRY S. MARTIN, citizens of the United States, respectively residing at West New York, in the county of Hudson, and State of New Jersey, and at Ridgewood, in the county of Bergen and State of New Jersey, have invented certain new and useful Improvements in Fire Bricks, of which the following is a specification.

Our invention relates to fire brick, fire arches and fire walls, and is particularly concerned with brick for sectional refractory structures of this character such as are used in boiler fire boxes of the locomotive type. An important object of our invention is to improve and facilitate the construction of arches and bridge walls wholly or partly supported from circulating water legs. We aim to make the arch or wall strong, secure and durable, and to make the individual brick simple, rugged, and relatively inexpensive to manufacture; also, to adapt one and the same form of individual brick to the construction of various types of structures.

How these and other advantages may be secured through our invention will appear from our description hereinafter of the best embodiments of the invention known to us.

In the drawings, Fig. 1 shows a vertical longitudinal midsection through a locomotive fire box having circulating water legs and a fire arch constructed and arranged in accordance with our invention,—the section being taken as indicated by the line 1—1 in Fig. 2,—and Fig. 2 is a corresponding cross sectional view, taken as indicated by the line 2—2 in Fig. 1.

Fig. 3 is a view similar to Fig. 1, showing both a fire arch and a fire wall constructed and arranged in accordance with out invention,—the section being taken as indicated by the line 3—3 in Fig. 4,—and Fig. 4 is a corresponding cross sectional view, taken as indicated by the line 4—4 in Fig. 3.

Fig. 5 is a fragmentary view showing a vertical section through a fire wall such as shown in Fig. 3, taken as indicated by the line 5—5 in that figure; Fig. 6 shows a corresponding horizontal section, taken as indicated by the line 6—6 in Fig. 5; and Fig. 7 shows a corresponding vertical transverse section, taken as indicated by the line 7—7 in Fig. 5.

Figs. 8 and 9 are fragmentary views showing transverse sections through a fire arch such as shown in Fig. 3, taken as indicated by the lines 8—8 and 9—9 in that figure.

Figs. 10, 11, 12 and 13 are top, side, bottom and end views of a fire brick such as shown in Figs. 5 to 9; and Fig. 14 is a corresponding cross sectional view, taken as indicated by the line 14—14 in Fig. 10.

Figs. 15, 16 and 17 are top, bottom and side views of a similar but longer type of brick.

Fig. 18 is a side view of a similar but somewhat modified type of brick, very short as compared with those shown in Figs. 10 to 17; and Fig. 19 is a corresponding cross sectional view, taken at a plane corresponding to the line 19—19 in Fig. 18.

Figs. 20 and 21 are fragmentary vertical and horizontal sectional views through a fire box, illustrating the arrangement of bricks in a fire arch.

Figs. 22, 23 and 24 are fragmentary vertical sectional views illustrating other arrangements of bricks in fire box arches.

Figs. 27 and 28 are fragmentary transverse and longitudinal vertical sectional views showing a fire arch and a fire wall in a locomotive fire box of different type, equipped with three water legs,—the section in Fig. 28 being taken as indicated by the line 28—28 in Fig. 27.

Figs. 29, 30 and 31 are fragmentary vertical longitudinal sectional views illustrating constructions designed to facilitate access to the boiler flues.

Figure 3:
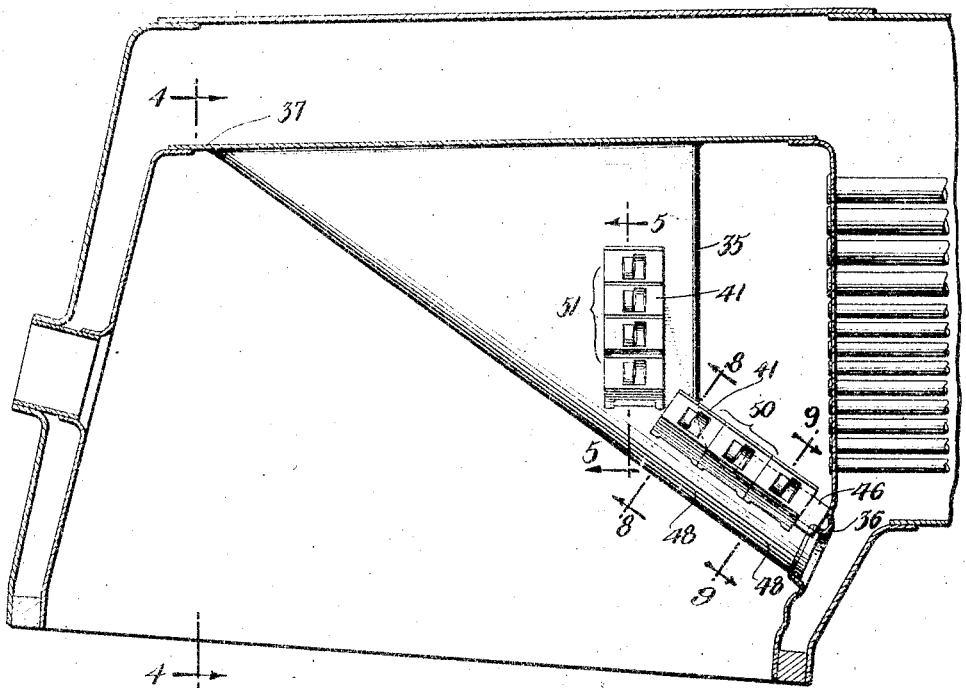

The locomotive fire box illustrated in Figs. 1 and 2 has two water legs 35 connected between the throat sheet 36 and the crown sheet 37. Each water leg 35 is of generally flat triangular form. The upper side of the triangle is united to the crown sheet 37 and opens therethrough throughout its own entire length, and the lower corner is connected to the throat sheet 36 by a round, curving, neck-like prolongation 38. For most of its length, the lower side of the triangle has a rounded and enlarged bottom 39 conforming in size and outline to the neck 38,— of bulb-like cross section, in other words. From the throat sheet 36 rearward extends an upward sloping sectional fire arch 40, constructed of refractory fire brick 41 supported from the water legs 35 and the fire box sides 42. As shown, the bricks 41 are oblong, and on one end or short edge each is bevelled or reduced at 43 to facilitate its stable engagement on the water leg portion 39, and also reduced toward its upper side at 44. The opposite end or edge of each brick 41 is also shown somewhat reduced or bevelled at 45 for arching engagement with a similar brick. Each fore and aft unit of the fire arch 40 is thus made up of two rows of brick 41 leaning against one another arch fashion, and supported from the water legs 35 or the side walls 42 of the fire box as abutments. Just adjacent the throat sheet 36, the upper side of each neck 38 carries a spacing brick 46 conformably recessed at its own lower side.

The brick 41 and the preferred mode of supporting them as shown in Fig. 1 will be described more fully hereinafter.

Figure 4:
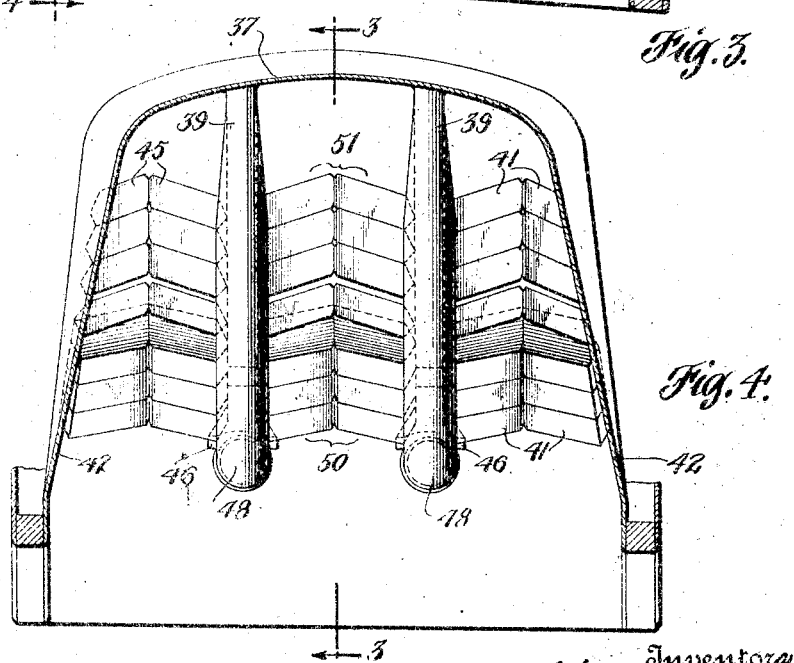
Figure 6:
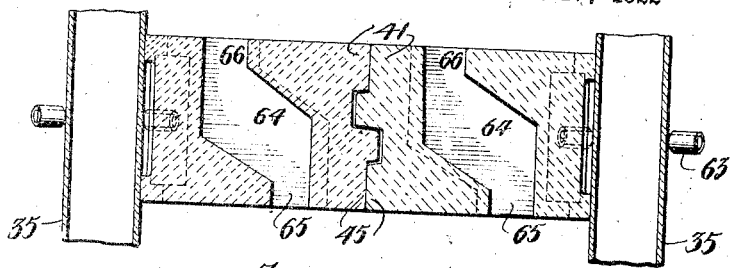
Figure 5:
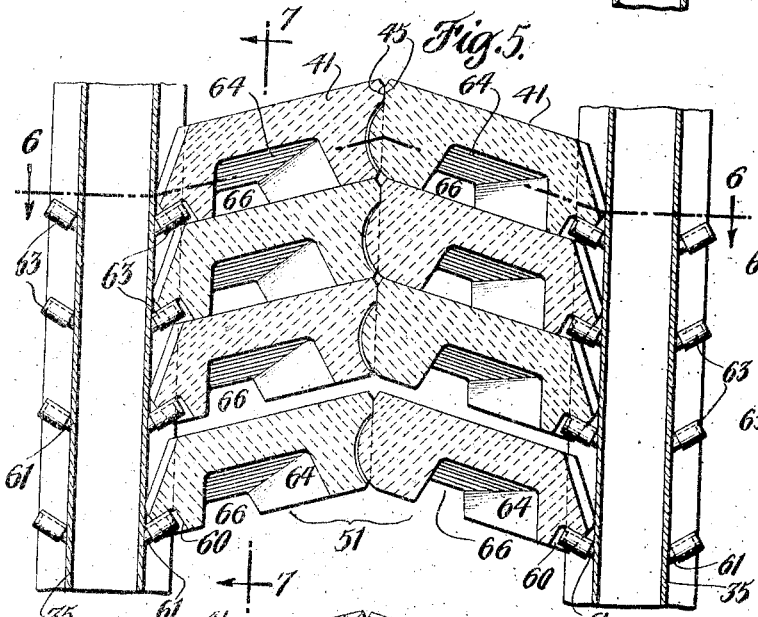
Figure 7:
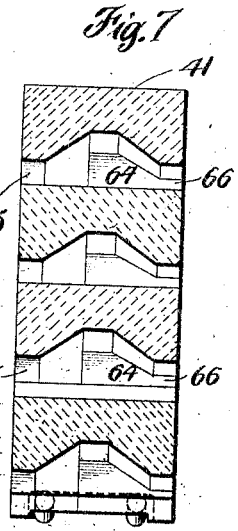
Figure 8:
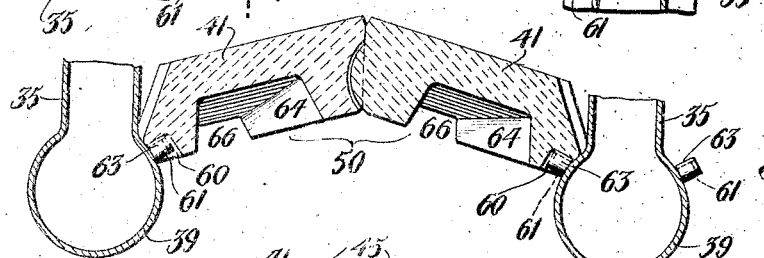
Figure 9:
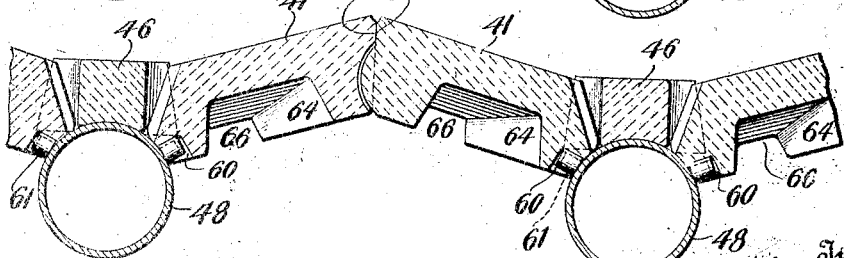

In Figs. 3 and 4, the connecting neck 48 is uncurved, and somewhat longer than the neck 38 of Figs. 1 and 2, and the fire arch 50 extends rearward but just beyond the forward edge of the leg 35. From the rear end of the arch 50, a fire wall 51 of brick 41 extends vertically upward some distance. Between the bottom of the wall 51 and the rear end of the arch 50 is an irregular space of a few inches, and above the lowermost course in the wall 51 is likewise a clearance of an inch or so. These serve as draft openings for producing more thorough intermixture and combustion of the gases.

While the brick 41 of the fire arches and fire wall illustrated Figs. 1 to 4 may in practice have the exact forms there shown, we generally prefer to make them of the forms shown in Figs. 5 to 19, and to support or mount them as illustrated in Figs. 5 to 9. As here shown, the arching face 45 of the brick has a groove-like recess or socket 56 and a corresponding tongue or ridge-like projection 57, each adapted to interengage or interlock with corresponding means on a similar brick, so as to prevent sidewise displacement of opposed brick with reference to one another. The socket 56 and the tongue 57 of each brick are virtual counterparts, and are located side by side, symmetrical with respect to a central longitudinal plane of the brick. The tongue end is vertically curved or rounded to a considerable radius, to enable the tongue 57 to engage or lie in the crease or hollow of a water leg above the enlargement 39, and the bottom of the recess 56 is similarly curved. (See, for example, Fig. 22.)

The sides of the recess 56 and of the tongue 57 slope toward one another somewhat. In the reduced upper portion 44 of the abutting end of the brick is a broad, shallow up and down groove 58 that affords a clearance between the resultant abutting ridges at the corners of the brick, and thus assures definite bearing at these corners.

The reduced lower abutting portion 43 of the brick is recessed at 60 to afford a seat or socket for interlocking or engagement means on the water wall abutment structure (i. e., on the neck 38, or 48, the enlargement 39, the fire box sides 42, or the sides of the water leg 35). As shown, the engagement means in question has the form of one or more lug-like pins or studs 61, which may be some ¾" in diameter and of the same or somewhat greater length, and may be welded to the abutment structure wherever required. (In Fig. 1, of course, the studs 61 are not to be confused with the heads of the stay bolts 62 that stay the flat sides of the water legs 35 together.) The recesses 60 have the form of right angled V grooves whose upper load-carrying sides slope upward a little with reference to the plane of the brick. As shown, there are enlarged sleeves 63 fitted on the studs 61. Where security requires it, there may be two studs 61 arranged to engage in the opposite ends of each recess 60. Preferably, the lower face of the brick are hollowed out or recessed in frustro-pyramidal fashion, as shown at 64, for the sake of economy of material and to provide more thorough compression and homogeneity of the bricks as manufactured, as well as for slag-retaining purposes. As illustrated, the portions of the brick enclosing recess 64 have grooves 65 and 66 at either end of the recess. With the recess 64 itself, these grooves 65 and 66 form a crooked transverse passage or channel across the bottom side of the brick intermediate its arching and abutting edges, reduced in depth at either end. In the wall 51 of Figs. 3 and 4, these passages serve as draft openings in supplementation of those already mentioned.

In the medium-long brick shown in Figs. 5 to 14, there is one crooked transverse passage such as just described, while in the longer brick illustrated in Figs. 15 to 17, there are two such passages. In the relatively short brick of Figs. 18 and 19, the transverse passage or channel 67 is not crooked, but is reduced in depth by a strengthening ridge 68 of the brick material across its middle.

Figs. 20 and 21 supplement the preceding illustration as regards the arrangement of brick in the arch 40 and 50 of Figs. 1, 2, 3 and 4. Fig. 22 shows a construction in which the rows of rather short opposed bricks forming each arch unit in Figs. 20 and 21 are replaced by a single row of long bricks. Here the bricks in the arch units to right and left rest on studs 61 at one end and lean against the fire box sides 42 at the other end; while the bricks in the middle arch unit simply rest in the angles above the water leg enlargements 39 at both ends. Fig. 23 shows a construction like that of Fig. 22 as regards the right and left hand arch units, but different as regards the middle arch unit. In this middle unit, alternate bricks rest on studs 61 on the right hand water leg 39, and lean against the left hand water leg, and the others rest on studs 61 on the left hand water leg and lean against the right hand water leg.

In Fig. 24, there are three water legs. The two middle arch units may be like the middle one of Fig. 23; the outside arch units are of greater span, and are constructed like the outside units of Figs. 20 and 21.

Figure 25:
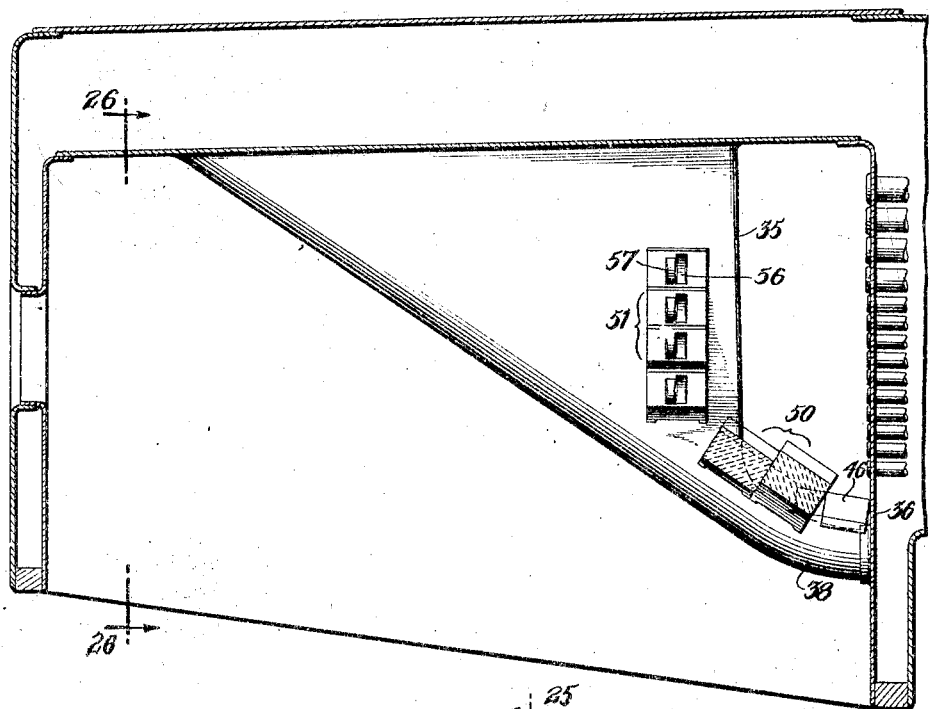
Figs. 25 and 26 are sectional views similar to Figs. 3 and 4 showing a fire arch and a fire wall in a locomotive fire box having but a single water leg.
Figure 26:
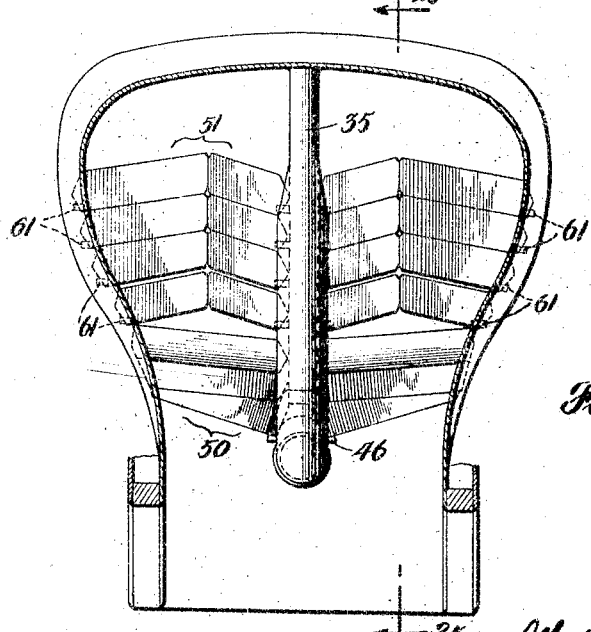

Figs. 25 and 26 show a fire box in which there is but a single water leg 35. Here the right and left hand arch units are of the construction illustrated at right and left in Figs. 22 and 23. The right and left hand fire wall units, on the other hand, are of the construction illustrated in Figs. 3 and 4. In Fig. 26, it may be observed how the studs 61 are arranged to give a clearance of about an inch above the lowermost pair of bricks in each wall unit. The protective brick 46, on the neck 38, gives a clearance of several inches between the forward end of the fire arch 50 and the throat sheet 36, just as in Figs. 1 to 4. In addition, there is also a clearance between the arch 50 and the wall 51, as in Figs. 3 and 4.

Figs. 27 and 28 show a boiler of somewhat different type from that of the preceding figures, equipped with three water legs 35. Here the fire arch 50 and the water wall 51 are of substantially the construction illustrated in Figs. 3 and 4,—except that the arch proper lies directly against the throat, without intervention of any special neck-protecting brick, and that in the middle spans there are single brick leaning toward the intermediate neck 38 as in the right and left spans of Fig. 22.

Figs. 29, 30 and 31 show constructions in which the arch 50 resembles that of Fig. 22. The fire wall, however, is not vertical, but is sloped rearward more or less, so as to facilitate access to the fluesheet 71 upon occasion. Neck-protecting brick 46 are used; but the wall and the arch are separated by very little or no clearance. In Fig. 29, the wall 70 is virtually of arch construction, each brick in the wall being sloped just as in the arch 50, but offset upward. Here there are two supporting studs 61 for each brick, set at an angle corresponding to the slope. In Fig. 30, the fire wall is virtually of "wall" construction, with each of its successive rows offset rearward about half the brick width with reference to the row beneath. As shown, the lowermost brick rest on horizontal pairs of pins 61, and half of each brick above rests on that beneath. In Fig. 31, the offsetting of Fig. 30 is carried so far that the forward edge of the brick in each row coincides with the rear edge of the brick in the row beneath. Here each brick rests on a horizontal pair of pins 61.

In the figures illustrating various constructions, we have applied the same reference characters to parts that are substantially alike, as a means of dispensing with merely repetitive description.

We claim:

1. A brick for sectional fire arches or fire walls having an edge for arching engagement provided with tongue and groove means for interlocking with corresponding means on a similar brick, having its opposite edge recessed for interlocking engagement with lug means on an abutment structure, and having a crooked transverse passage therein.

2. A brick for sectional fire arches and fire walls having an edge for arching engagement with a similar brick, an edge for interlocking engagement with an abutment, and a crooked lateral passage therein intermediate said edges.

3. A brick for sectional fire arches and fire walls having an edge for arching engagement with a similar brick, an edge for interlocking engagement with an abutment, and a crooked lateral passage therein intermediate said edges with local reduction in depth.

In testimony whereof, we have hereunto signed our names.

ALFRED H. WILLETT.
HARRY S. MARTIN.